US 011414214 B2

United States Patent
Fauchery et al.

(10) Patent No.: US 11,414,214 B2
(45) Date of Patent: Aug. 16, 2022

(54) FAIL-SAFE FASTENER FOR AIRCRAFT

(71) Applicant: SKF AEROSPACE FRANCE S.A.S., Montigny-le-Bretonneux (FR)

(72) Inventors: Florent Fauchery, Montmeyran (FR); Rémi Sarlin, Allex (FR)

(73) Assignee: SKF AEROSPACE FRANCE S.A.S, Montigny-le-Bretonneux (FR)

( * ) Notice: Subject to any disclaimer, the term of this patent is extended or adjusted under 35 U.S.C. 154(b) by 0 days.

(21) Appl. No.: 16/990,323

(22) Filed: Aug. 11, 2020

(65) Prior Publication Data

US 2021/0078731 A1 Mar. 18, 2021

(30) Foreign Application Priority Data

Sep. 16, 2019 (EP) ..................................... 19197567

(51) Int. Cl.
  *B64F 5/10* (2017.01)
  *F16B 7/00* (2006.01)
(52) U.S. Cl.
  CPC . *B64F 5/10* (2017.01); *F16B 7/00* (2013.01)
(58) Field of Classification Search
  CPC .................................... B64F 5/10; F16B 7/00
  See application file for complete search history.

(56) References Cited

U.S. PATENT DOCUMENTS

| 10,384,807 | B2* | 8/2019 | Caywood | B24C 3/00 |
| 2008/0283667 | A1 | 11/2008 | Darrow | |
| 2017/0029088 | A1* | 2/2017 | Gruner | B32B 27/18 |
| 2017/0327157 | A1 | 11/2017 | Jaunasse et al. | |
| 2018/0079527 | A1* | 3/2018 | Kamihara | B32B 7/08 |
| 2019/0003504 | A1* | 1/2019 | Bradley | B64C 3/26 |
| 2020/0062371 | A1* | 2/2020 | Hackenberg | B64F 5/10 |

FOREIGN PATENT DOCUMENTS

| GB | 2559403 A | 8/2018 |
| WO | 2015042632 A2 | 4/2015 |

OTHER PUBLICATIONS

European Search Report from the European Patent Office dated Dec. 6, 2019 in related EP application No. 19197567.1, including Search Opinion and Search Report.

* cited by examiner

*Primary Examiner* — Nirvana Deonauth
(74) *Attorney, Agent, or Firm* — J-Tek Law PLLC; Scott T. Wakeman; Mark A. Ussai (57) ABSTRACT

A fail-safe fastener configured to mechanically fasten a first aircraft component to a second aircraft component includes a first body formed from a first material and at least one second body formed from a second material different than the first material, the at least one second body being stacked on a side of the first body, wherein the first body and/or the at least one second body is or includes a composite material.

20 Claims, 6 Drawing Sheets

FAIL-SAFE FASTENER FOR AIRCRAFT

CROSS-REFERENCE

This application claims priority to European patent application no. 19197567.1 filed on Sep. 16, 2019, the contents of which are fully incorporated herein by reference.

TECHNOLOGICAL FIELD

The present disclosure is directed to a fail-safe system intended for use in an aircraft.

BACKGROUND

Fail-safe systems are used in airframe architecture in order to improve the reliability of systems embedded within an aircraft, such as the reliability of the fastening of two components of the aircraft. In the latter case, a typical fail-safe system uses in parallel two different parts made of different material and each having two ends respectively secured to the two components. Classically, one part comprises aluminum whereas the other part comprises titanium.

The mechanical load entailed by fastening the two components is distributed on the two parts of the fail-safe system. Hence, one part is a principal load path whereas the other part is a secondary load path. The principal load path is normally the one sustaining the load during normal operation of the system.

If the part which is the principal load path breaks, for instance due to an excessive static load or fatigue, the other part sustains the load in place of the first. Therefore, the failure of the principal load path does not lead to a dramatic system failure.

A significant drawback of such a conventional fail-safe system is that corrosion or fatigue may occur and decrease the reliability of the system. Furthermore, those systems entail a significant weight and are costly to manufacture.

SUMMARY

The disclosure aims at overcoming the above-mentioned drawbacks.

More specifically, the disclosure aims at obtaining a fail-safe system which deals better with corrosion and fatigue, without being significantly heavy.

A first aspect of the disclosure comprises a fail-safe system configured to mechanically fasten two aircraft components, the fail-safe system including a first set, a second set made of a material different from the material of the first set, the first set and the second set being stacked up, wherein at least one of the first and second sets includes at least one layer of composite material.

Such an arrangement takes advantage of the fatigue strength of composite material and of the very good specific weight of the composite material. Hence, the fail-safe system according to the disclosure is more resistant to fatigue and corrosion and is also lighter than fail-safe systems of the prior art.

Advantageously, each set includes two regions respectively adapted to be secured to the two aircraft components.

In an embodiment, the material of the first set and of the second set are mechanically bonded to each other, for instance by gluing, welding or any joining technique. In an alternative embodiment, the material of the first set and of the second set are mechanically free from fastening.

Preferably, one of the first and second sets includes a metallic plate.

In an embodiment, each set includes a layer of composite material, the material composition of the layer of the first set and the material composition of the layer of the second set being different.

Such a particular arrangement allows a fail-safe system to be a single multi-layer part, wherein one of the first and second sets constitutes a first load path and the other set constitutes a second load path. One may thus obtain the fail-safe effect without doubling the number of parts used, thus limiting considerably the increase of weight, cumbersomeness and manufacturing costs.

Advantageously, the first and second sets are cured simultaneously. Nevertheless, the first and second sets can be made as two different parts without departing from the scope of the disclosure.

Preferably, the composite material of the layer of the first set includes fibers having a first stiffness, and the composite material of the layer of the second set including fibers having a second stiffness, the first stiffness and the second stiffness being different.

Hence, the fibers of one of the first and second sets may break whereas the fibers of the other of the first and second sets remain unbroken. The fail-safe effect is thus further improved.

It is also possible to include a separation sheet inserted between the first set and the second set.

The failure of fibers of the composite material can release a lot of energy and act as a brittle failure, easily propagated to subsequent sets. Hence, the separation sheet acts as a failure propagation breaker in order to further improve the fail-safe effect.

Advantageously, the separation sheet is made of a material having an elongation at break being at least equal to a minimum elongation at break, and:

$$e_{min} = 2 * \max(e_1, e_2)$$

wherein $e_{min}$ is the minimum elongation at break, $e_1$ is the elongation at break of the fibers of the first set and $e_2$ is the elongation at break of the fibers of the second set.

The choice of such a material increases considerably the efficiency of the separation sheet acting as a failure propagation breaker.

Preferably, the separation sheet includes an elastomer.

Such a material is particularly well adapted for use as a failure propagation breaker between a set including layers or plies of composite material and a set including a metallic plate or layers of composite material.

According to another aspect of the disclosure, a method of making a fail-safe system includes the following steps:
  at least partially making a first set,
  at least partially making a second set made of a material different from the material of the first set,
  stacking up the first set and the second set,
  wherein the step of making the first set and/or the step of making the second set includes using at least one layer of composite material.

Preferably, the step of making the first set includes stacking up a plurality of layers of a first composite material, the step of making the second set includes stacking up a plurality of layers of a second composite material, the first composite material and the second composite material being different, the method further including, after the step of making the second set, the step of curing the first set and the second set simultaneously.

According to a third aspect of the disclosure, a fail-safe system as defined above is used in an aircraft.

BRIEF DESCRIPTION OF THE DRAWINGS

The present invention and its advantages will be better understood by studying the detailed description of specific embodiments given by way of nonlimiting examples and illustrated by the appended drawings on which.

DETAILED DESCRIPTION

Figure 1:
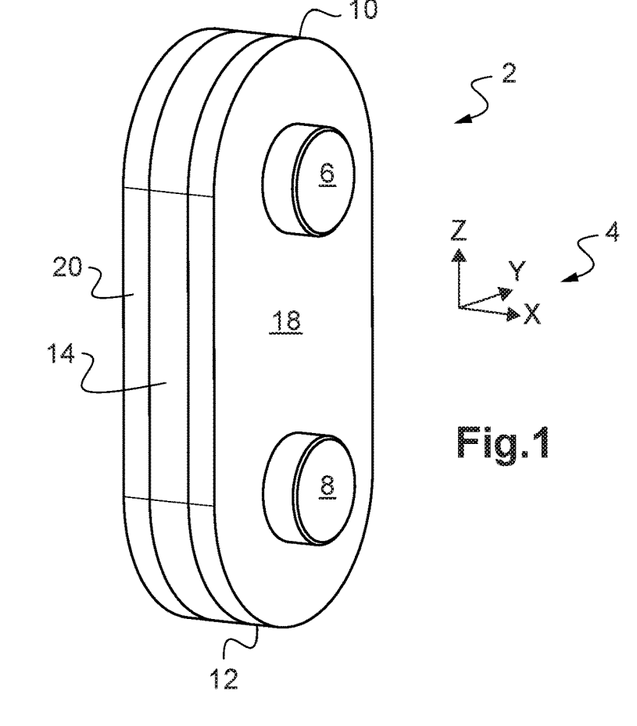
FIG. 1 is a perspective view of a fail-safe system according to a first embodiment of the disclosure.

FIG. 1 schematically depicts a fail-safe system 2 according to a first embodiment of the disclosure. The fail-safe system 2 is intended to be installed in an aircraft, more particularly in an airframe architecture. Nonetheless, the fail-safe system 2 may be used, without departing from the scope of the disclosure, in another section of the aircraft.

The fail-safe system 2 is defined relative to an orthonormal direct vector base 4. The base 4 consists of a vector X, a vector Y and a vector Z.

In the present application, the terms "low" and "up" or variations thereof will be understood as referring relative to the base 4 when the vector Z is vertically upwardly directed.

In addition, the word "cylindrical" will be understood according to its common definition, being namely that a cylindrical surface is a surface consisting of all the points on all the lines which are parallel to a given line and which pass through a fixed plane curve in a plane not parallel to the given line.

In the depicted embodiment, the fail-safe system 2 is configured to mechanically fasten two aircraft components 6 and 8. In FIGS. 1 to 9, the components 6 and 8 are schematically depicted as cylindrical parts having a circular cross-section about an axis parallel to the vector X. Of course, any geometry of the aircraft components 6 and 8 can be used without departing from the scope of the disclosure.

Figure 2:
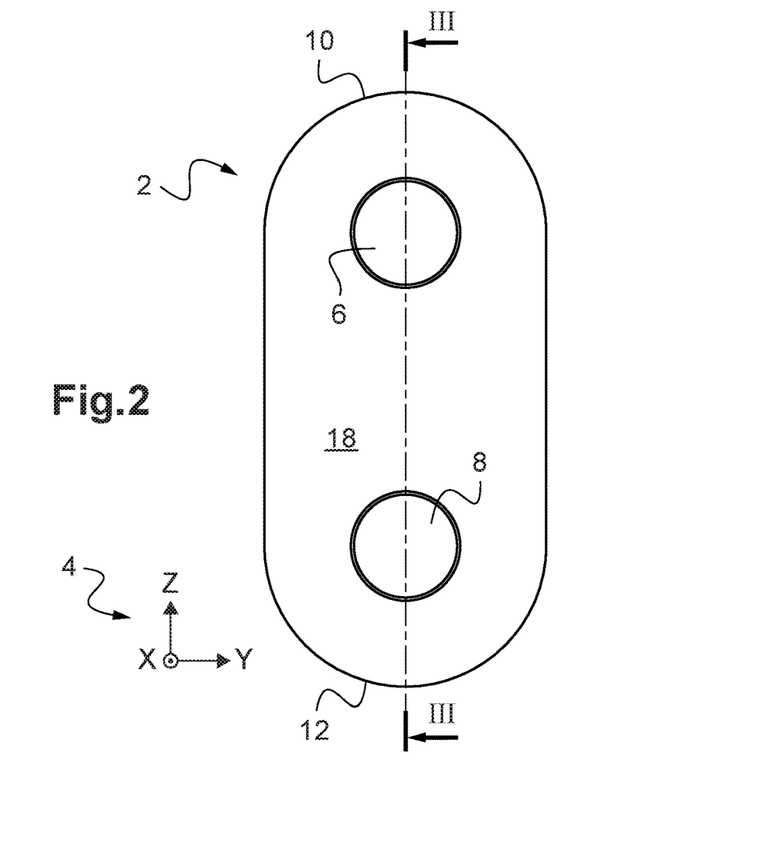
FIG. 2 is a front elevational view of the fail-safe system of FIG. 1.
Figure 3:
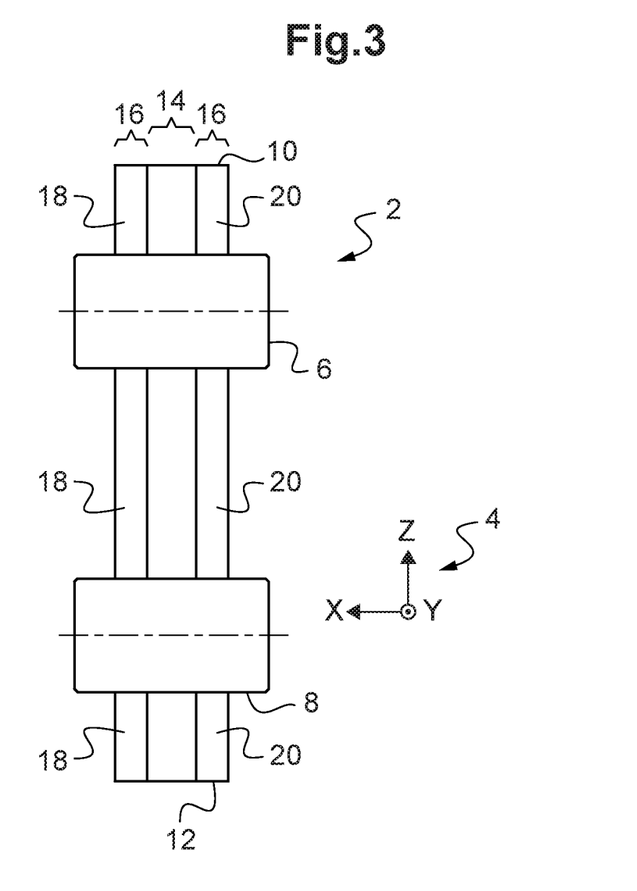
FIG. 3 is a cross-sectional view taken in the direction of line of FIG. 2.

As visible on FIGS. 1 and 2, the fail-safe system 2 has an elongated shape and its longitudinal direction is parallel to the vector Z. The cross-sectional view of FIG. 3 is taken along the plane III-III depicted on FIG. 2 and perpendicular to the vector Y. The fail-safe system 2 is mechanically secured, in vicinity of an upper end 10, to the aircraft component 6 and mechanically secured, in vicinity of a lower end 12, to the aircraft component 8. In the depicted embodiments, the fail-safe system 2 is mechanically secured to the aircraft components 6 and 8 by means of cylindrical bores (not referenced) respectively accommodating a portion of the aircraft components 6 and 8. Nevertheless, one may use a different securing means without departing from the scope of the disclosure.

Referring now to FIG. 3, the fail-safe system 2 may be divided into a central body 14 and a set 16 of two side bodies 18, 20, which may be referred to as "subsets" 18, 20 of the set 16. The body 14 and the side bodies 18 and 20 are substantially planar and perpendicular to the vector X. The body 14 and the side bodies 18 on 20 are stacked up such that the central body 14 is located between the side bodies 18 and 20.

In the first embodiment, the central body 14 and the side bodies 18 and 20 each comprise of a plurality of plies or layers of composite material. The composite material composing the central body 14 and the side bodies 18 and 20 includes epoxy resin and stiffening fibers. The stiffening fibers of the composite material of the side bodies 18 and 20 are different from the stiffening fibers of the composite material of the central body 14. More specifically, the stiffness $s_{16}$ of the stiffening fibers of the side bodies 18 and 20 is different from the stiffness $s_{14}$ of the stiffening fibers of the central body 14.

In the present embodiment, the stiffening fibers of the central body 14 are carbon fibers and the stiffening fibers of the side bodies 18 and 20 are glass fibers.

The use of two different a first body made of one material and at least one second body made of a different material, namely two composite materials whose stiffening fibers have respectively two different stiffnesses, satisfies the fail-safe requirement. For instance, the carbon composite central body 14 may be the principal load path whereas one or both of the set 16 of side bodies form the secondary load path. In those conditions, the central body 14 sustains the load during the normal operation. If the central body 14 breaks, the set 16 of side bodies will be the one sustaining the load in place of the central body 14. That is, the fail-safe function is ensured by means of a single multilayer composite part.

Although it has been assumed, in this embodiment, that the central body 14 is the principal load path whereas the set 16 of side bodies is the secondary load path, one may without departing from the scope of the disclosure, modify the composition and/or the dimensions of the body 14 and set 16 of bodies in such a way that the set 16 of side bodies becomes the principal load path and the central body 14 becomes the secondary load path.

As well, one may, without departing from the scope of the disclosure, modify the set of side bodies 16 in such a way that it includes only one of the side bodies 18 and 20.

In the depicted embodiments, the central body 14 and set of side bodies 16 are each made of a plurality of layers of composite material. Nevertheless, one may imagine, without departing from the scope of the disclosure, that a set is made of only one ply of composite material.

The disclosure is not limited to the above-mentioned stiffening fibers. In particular, without departing from the scope of the disclosure, carbon fibers or glass fibers may be inversed or replaced with other fibers such as polymer fibers, flax fibers, basalt fibers, steel fibers, etc.

Figure 4:
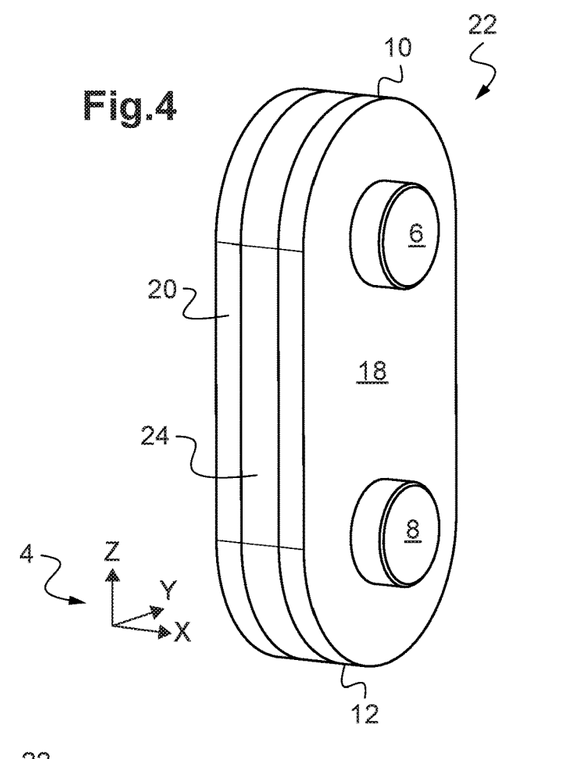
FIG. 4 is a perspective view of a fail-safe system according to a second embodiment of the disclosure.
Figure 5:
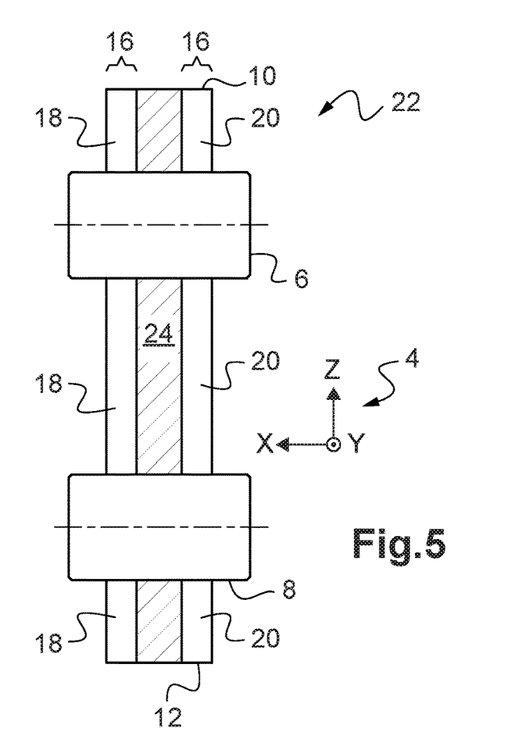
FIG. 5 is a cross-sectional view of the fail-safe system of FIG. 4.

FIGS. 4 and 5 illustrate a fail-safe system 22 according to a second embodiment of the disclosure in which the same elements bear the same references. The cross-sectional view of FIG. 5 is taken along the same plane as the cross-sectional view of FIG. 3.

The fail-safe system 22 differs from the fail-safe system 2 in that the central body 14 is replaced with a central body 24 comprising a metallic plate. The glass composite side bodies 18 and 20 are overmold on the metallic plate 24.

In this embodiment, for instance, the metallic plate 24 acts as a principal load path whereas the glass fibers composite set 16 of bodies acts as a secondary load path.

As in the first embodiment, the glass fiber composite set 16 of bodies may act as a principal load path and the metallic plate 24 may act as a secondary load path. Also, in another variant, the central body 24 may comprise a plurality of layers of composite material and the side bodies 18, 20 may comprise two metallic plates on either side of the central body 24.

Figure 6:
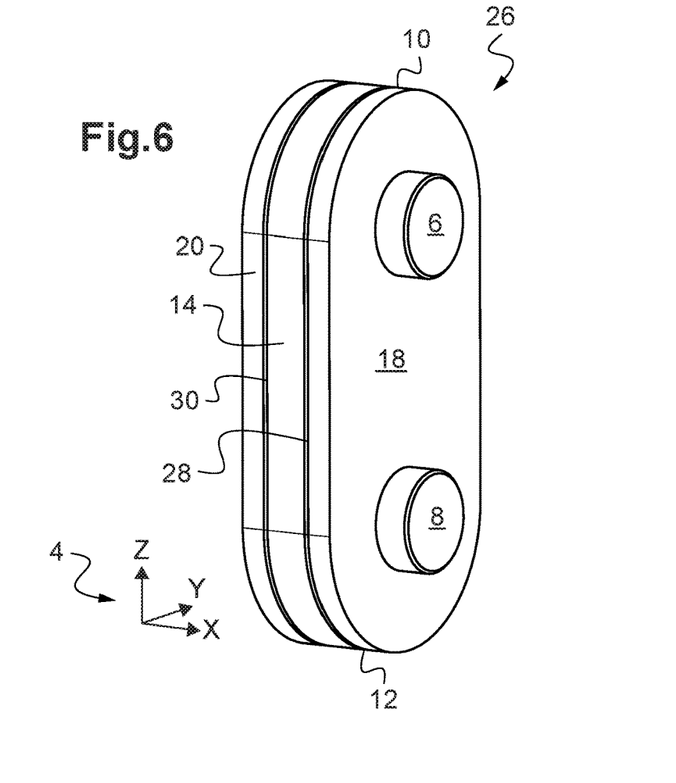
FIG. 6 is a perspective view of a fail-safe system according to a third embodiment of the disclosure.
Figure 7:
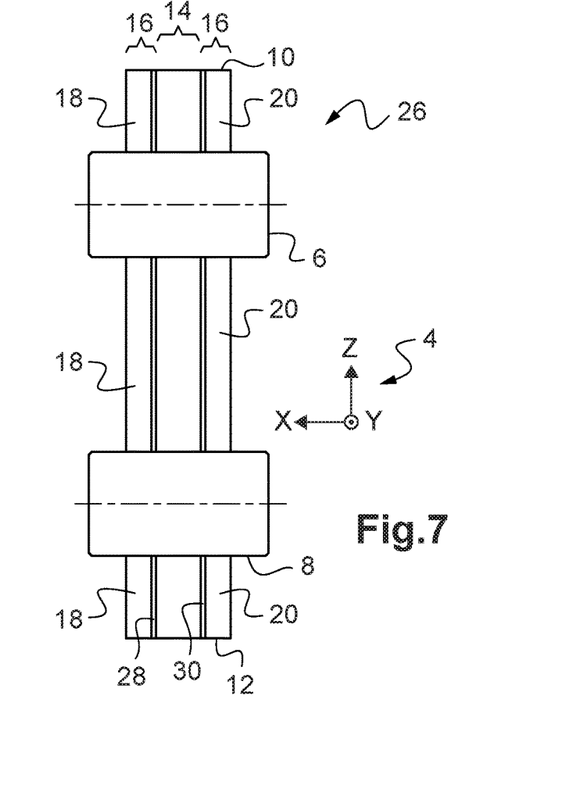
FIG. 7 is a cross-sectional view of the fail-safe system of FIG. 6.

A fail-safe system 26 according to a third embodiment of the disclosure is depicted in FIGS. 6 and 7 in which the same elements bear the same references. The cross-sectional view of FIG. 7 is taken along the same plane as the cross-sectional view of FIG. 3.

The fail-safe system 26 differs from the fail-safe system 2 in that it further includes separation sheets 28 and 30 between the central body 14 and the side bodies 16. Namely, the separation sheet 28 is inserted between the side body 18 and the central body 14 and the separation sheet 30 is inserted between the central body 14 and the side body 20.

The separation sheets 28 and 30 are made of a material having an elongation at break $e_{2830}$ (e.g., the elongation at break "e" of the separation sheets 28 and 30) The elongation $e_{2830}$ is higher than twice the elongation at break of the stiffening fibers of the most ductile of the bodies 14 and 16. In other words:

$$e_{2830} \geq 2*\max(e_{carbon}, e_{glass})$$

wherein $e_{carbon}$ and $e_{glass}$ are respectively the elongation at break of the carbon fibers and glass fibers.

In this embodiment, the separation sheets 28 and 30 are made of an elastomer.

Although the separation sheets 28, 30 have been described referring to an example wherein each set is made of layers of composite material, separation sheets may be inserted next to the central body 24 comprising a metallic plate in the embodiment of FIGS. 4 and 5.

In the latter case, the elongation at break $e_{2830}$ of the separation sheets may be, for instance, higher than twice the elongation at break of the stiffening fibers of the composite set 16. That is, in the embodiment of FIGS. 4 and 5:

$$e_{2830} \geq 2*e_{glass}$$

Figure 8:
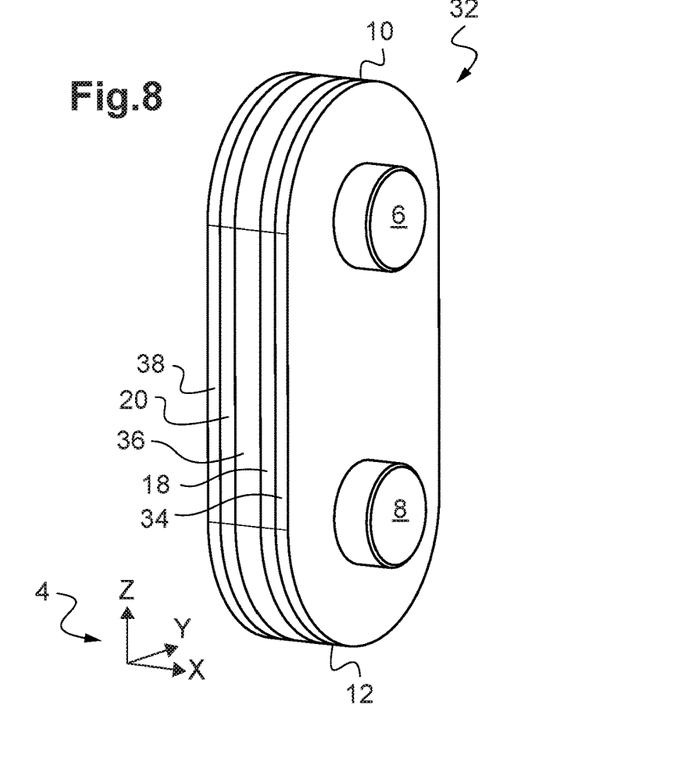
FIG. 8 is a perspective view of a fail-safe system according to a fourth embodiment of the disclosure.
Figure 9:
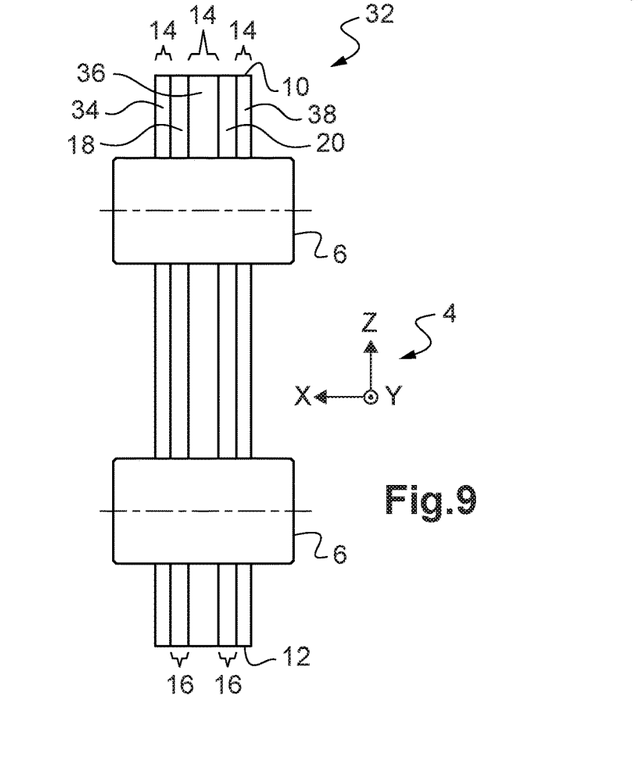
FIG. 9 is a cross-sectional view of the fail-safe system of FIG. 8.

FIGS. 8 and 9 illustrate a fail-safe system 32 according to a fourth embodiment of the disclosure in which the same elements bear the same references. The cross-sectional view of FIG. 9 is taken along the same plane as the cross-sectional view of FIG. 3.

The fail-safe system 32 differs from the fail-safe system 2 in that the central body 14 includes three subsets of bodies, namely, bodies 34, 36 and 38. The subsets of bodies 34, 18, 36, 20 and 38 are stacked up in this order. While various materials can be used for each of the bodies, it is contemplated that the bodies 14 in FIG. 9 will comprise the one support path, for example, the main support path, and the bodies 16 will provide the backup support path.

Figure 10:
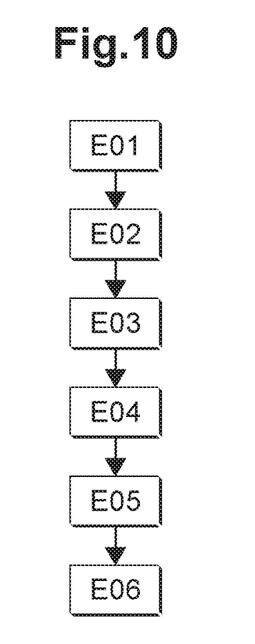
FIG. 10 illustrates a method of making a fail-safe system.

Referring now to FIG. 10, a method of making the fail-safe system 32 will now be described.

The method of FIG. 10 includes a first step E01 of making the body 34. In step E01, a plurality of layers of carbon composite material are stacked up. Step E01 ends when the body 34 is made up.

The method includes a second step E02 of making the body 18. In step E02, a plurality of layers of glass composite material are stacked up directly on the body 34 formed during previous step E01. Step E02 ends when the body 18 is made up and stacked up on the body 34.

The method further includes steps E03, E04 and E05 of making the respective bodies 36, 20 and 38 directly stacked up on the previously made up bodies. During each of the steps E03, E04 and E05, the body which is made is directly formed by stacking up layers of composite material on the bodies which have been made during the previous steps. During steps E03 and E05, the layers of composite material which are stacked up includes carbon fibers whereas during step E04, the layers of composite material which are stacked up includes glass fibers. At the end of step E05, the sets 14 and 16 are made up and stacked up as illustrated on FIGS. 8 and 9.

Then, the method of FIG. 10 includes a sixth step E06 of curing the bodies 14 and 16 simultaneously. At the end of step E06, the bodies 14 and 16 are stacked up to form a single multilayer composite material part.

That is, the method of FIG. 10 includes no more steps than a method of making a classic composite material part. Hence, the disclosure allows making a fail-safe system without increasing the manufacturing costs, without increasing the weight and without rendering components more cumbersome.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved fail-safe systems.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A method of joining a first aircraft component to a second aircraft component comprising:
   providing a connector comprising:
   a first body having a first face, a second face opposite the first face, a first through opening from the first face to the second face and a second through opening from the first face to the second face:
   a second body materially bonded to the first face of the first body, the second body having a first through opening aligned with the first through opening of the first body and a second through opening aligned with the second through opening of the first body; and a third body materially bonded to the second face of the first body, the third body having a first through opening aligned with the first through opening of the first body and a second through opening aligned with the second through opening of the first body;

connecting the first through openings of the connector to the first aircraft component; and connecting the second through openings of the connector to the second aircraft component, wherein the first body and/or the at least one second body comprises a first composite material.

2. The method according to claim 1, wherein the first body comprises the first composite material and the second body comprises a second composite material different than the first composite material, wherein the first body comprises a stacked plurality of layers of the first composite material, wherein the second body comprises a stacked plurality of layers of the second composite material, and the method further including curing the first body and the at least one second body simultaneously to materially bond the first body to the second body.

3. The method according to claim 1, wherein the first body comprises a metallic plate and the second body comprises the first composite material.

4. The method according to claim 1, wherein the first body comprises a layer of the first composite material and the second body comprises a layer of a second composite material different than the first composite material.

5. The method according to claim 4, wherein the layer of the first composite material includes first reinforcing fibers having a first stiffness, and wherein the layer of the second composite material includes second reinforcing fibers having a second stiffness different than the first stiffness.

6. A method of joining a first aircraft component to a second aircraft component comprising:

providing a connector comprising a first body having a first through opening and a second through opening, at least one second body having a first through opening and a second through opening and a separation sheet compressed between the first body and each of the at least one second body, the first through opening of the first body being aligned with the first through opening of each of the at least one second body and the second through opening of the first body being aligned with each of the at least one second through opening of the at least one second body, connecting the first through openings to the first aircraft component; and connecting the second through openings to the second aircraft component, wherein the first body and/or the at least one second body comprises a composite material.

7. The method according to claim 6, wherein the separation sheet includes first reinforcing fibers and second reinforcing fibers, wherein the separation sheet has an elongation at break at least equal to a minimum elongation at break $e_{min}$, wherein:

$$e_{mirs}=2*\max(e_1,e_2)$$

and wherein $e_1$ is an elongation at break of the first reinforcing fibers and $e_2$ is an elongation at break of the second reinforcing fibers.

8. The method according to claim 7, wherein the separation sheet includes an elastomer.

9. The method according to claim 1, wherein the first face and the second face of the first body are planar, and wherein the first body further includes a first planar side surface and a second planar side surface parallel to the first planar side surface, the first and second planar side surfaces extending from the first face to the second face, and a first arcuate end surface and a second arcuate end surface.

10. A method of joining a first aircraft component to a second aircraft component comprising:

providing a connector comprising a first body having a first through opening and a second through opening attached to at least one second body having a first through opening and a second through opening such that the first through opening of the first body is aligned with the first through opening of the at least one second body and the second through opening of the first body is aligned with the second through opening of the at least one second body;

connecting the first through openings to the first aircraft component; and connecting the second through openings to the second aircraft component, wherein the first body and/or the at least one second body comprises a first composite material, and further including, while the first through openings are connected to the first aircraft component and the second through openings are connected to the second aircraft component, breaking the first body without breaking the at least one second body.

11. The method according to claim 10, wherein the first body comprises a metal plate.

12. The method according to claim 10 wherein the first body comprises a layer of the first composite material and the at least one second body comprises a layer of a second composite material different than the first composite material.

13. The method according to claim 12, wherein the layer of the first composite material includes first reinforcing fibers having a first stiffness, and wherein the at least one layer of the second composite material includes second reinforcing fibers having a second stiffness different than the first stiffness.

14. The method according to claim 10, including, before attaching the at least one second body to the first body, providing a separation sheet between the first body and each of the at least one second body and compressing the separation sheet between the first body and each of the at least one second body.

15. The method according to claim 14, wherein the separation sheet includes first reinforcing fibers and second reinforcing fibers, wherein the separation sheet has an elongation at break at least equal to a minimum elongation at break $e_{min}$, wherein:

$$e_{min}=2*\max(e_1,e_2)$$

and wherein $e_1$ is an elongation at break of the first reinforcing fibers and $e_2$ is an elongation at break of the second reinforcing fibers.

16. The method according to claim 15,
wherein the first reinforcing fibers comprise glass fibers and the second reinforcing fibers comprise carbon fibers.

17. The method according to claim 5,
including while the first through openings are connected to the first aircraft component and the second through openings are connected to the second aircraft component, breaking the first body without breaking the second body.

18. The method according to claim 1,
wherein the connector comprises a first separation sheet compressed between the first body and the second body and a second separation sheet compressed between the first body and the third body.

19. The method according to claim 18,
wherein the first separation sheet and the second separation sheet each include first reinforcing fibers and second reinforcing fibers,
wherein the first separation sheet and the second separation sheet each have an elongation at break at least equal to a minimum elongation at break $e_{min}$,
wherein:

$$e_{min}=2*\max(e_1,e_2)$$

and
wherein $e_1$ is an elongation at break of the first reinforcing fibers and $e_2$ is an elongation at break of the second reinforcing fibers.

20. The method according to claim 18,
wherein the first separation sheet and the second separation sheet each include an elastomer.

* * * * *